United States Patent [19]

Herrick

[11] 4,102,015
[45] Jul. 25, 1978

[54] METHOD AND APPARATUS FOR PROCESSING POULTRY FEET AND THE LIKE

[75] Inventor: Duane Herrick, Turlock, Calif.

[73] Assignee: Foster Farms, Calif.

[21] Appl. No.: 829,267

[22] Filed: Aug. 31, 1977

[51] Int. Cl.² .......................................... A22C 21/00
[52] U.S. Cl. ...................................... 17/11; 17/11.2; 17/50; 17/51; 17/52
[58] Field of Search ............... 17/11, 11.2, 21, 50, 17/51, 45, 52

[56] References Cited

U.S. PATENT DOCUMENTS

| | | | |
|---|---|---|---|
| 3,119,145 | 1/1964 | Weprin | 17/50 X |
| 3,696,464 | 10/1972 | Dillon et al. | 17/11 |
| 3,930,282 | 1/1976 | Martin et al. | 17/11 |
| 3,930,283 | 1/1976 | Martin | 17/11 |

*Primary Examiner*—Frank T. Yost
*Attorney, Agent, or Firm*—Huebner & Worrel

[57] ABSTRACT

A method and apparatus for processing poultry feet and other parts having an outer skin including the steps of submersing the parts in a fluid heated to a temperature sufficient to blanch the parts, applying a multiplicity of flexible members to the skin moving so as to draw the skin in a predetermined direction while urging the parts gradually in an opposite direction to remove the skin from the parts, and severing the parts along predetermined paths to remove the undesirable portions therefrom.

11 Claims, 8 Drawing Figures

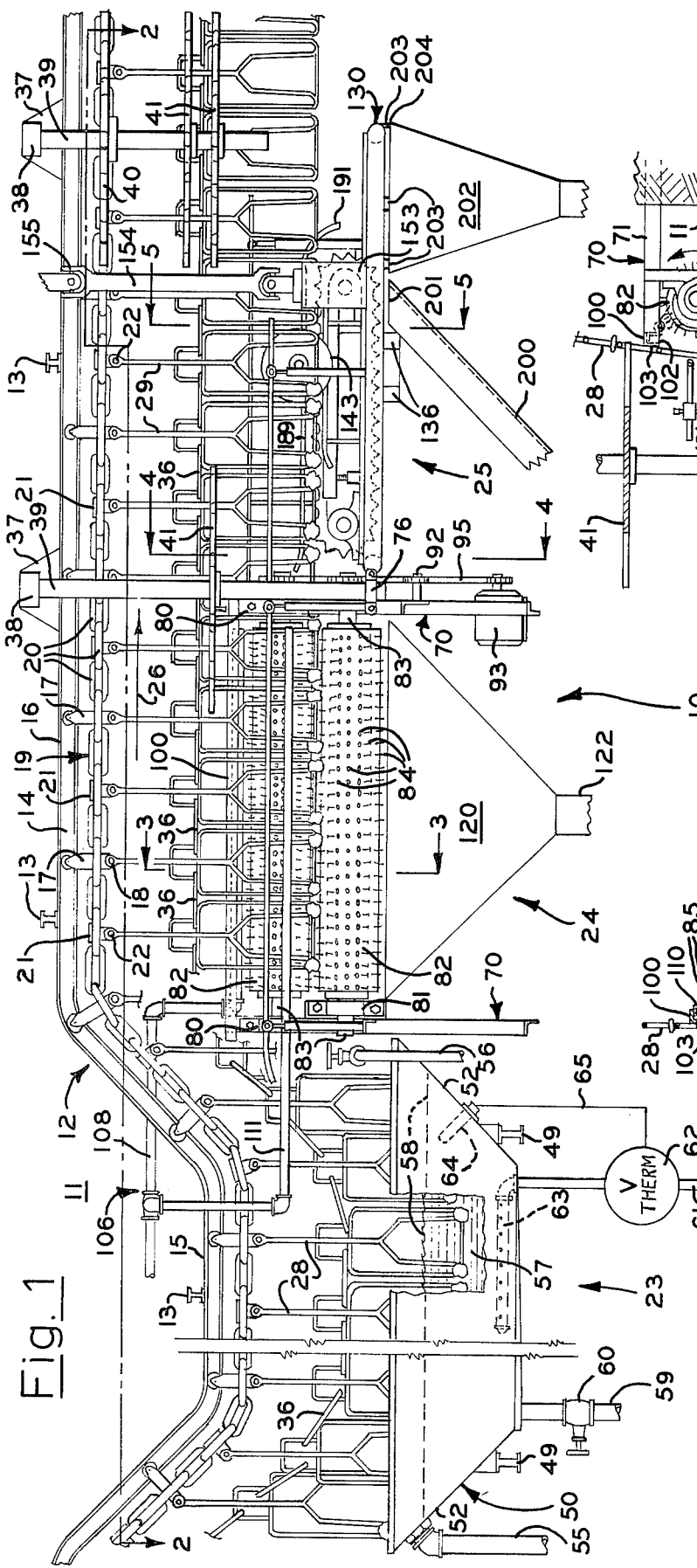
Fig. 1
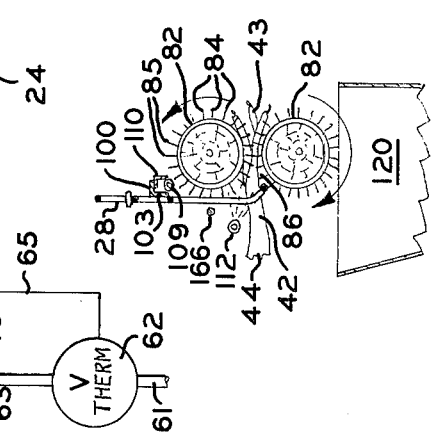
Fig. 3
Fig. 4

METHOD AND APPARATUS FOR PROCESSING POULTRY FEET AND THE LIKE

BACKGROUND OF THE INVENTION

1. Field of the Invention

The present invention relates to a method and apparatus for processing poultry feet and the like and more particularly to such a method and apparatus which has particular utility in the commercial processing of poultry by automatically and completely removing the skin and other undesired portions from the feet of the poultry thus permitting poultry feet to be processed and sold at a price compatible with the market demand.

2. Description of the Prior Art

While the prior art includes methods and apparatus for performing various poultry processing operations, insofar as the applicant is aware there are no known methods or apparatus for automatically removing the skin and other undesirable portions from poultry parts and, in particular, from poultry feet.

The demand for poultry feet as a specialty food item, particularly in the Orient, is relatively great. Approximately three hundred tons per month are currently being exported from the United States. However, the supply of poultry feet is limited and the cost is kept relatively high because of the lack heretofore of a fully automatic method and apparatus for processing such poultry parts. Conventional practice calls for the poultry feet to be skinned by batch processing methods in potato peeling machines. However, the labor required to remove the feet from the conveyor lines subsequent to other poultry processing operations, to sever undesirable portions from the feet and to transfer the feet to and from the batch processing machines makes the cost of poultry feet processed by such methods unattractive.

Therefore, it has long been known that it would be desirable to have a method and apparatus for processing poultry parts and the like automatically, dependably and economically to permit the sale of such parts at a commercially acceptable price and which has particular utility in the processing of poultry feet.

SUMMARY OF THE INVENTION

Therefore, it is an object of the present invention to provide an improved method and apparatus for processing poultry feet and the like.

Another object is to provide such a method and apparatus which permit the processing of poultry parts and particularly poultry feet at a commercially acceptable cost.

Another object is to provide such a method and apparatus which can easily be integrated into existing poultry processing lines to operate cooperatively therewith.

Another object is to provide such a method and apparatus which operate rapidly, automatically and completely to remove the skin and other undesirable portions of poultry feet on an assembly line basis.

Another object is to provide such a method and apparatus which are adapted to existing commercial poultry processing lines wherein each bird is initially hung in shackles for all subsequent processing operations.

Another object is to provide such a method and apparatus which are well suited for use with existing method of sanitation and waste disposal in commercial poultry processing plants.

Further objects and advantages are to provide improved elements and arrangements thereof in an apparatus for the purposes described which is dependable, economical, durable and fully effective in accomplishing its intended purposes.

BRIEF DESCRIPTION OF THE DRAWINGS

FIG. 1 is a fragmentary front elevation of an apparatus for processing poultry feet embodying the principles of the present invention.

FIG. 3 is a fragmentary vertical section taken on line 3—3 of FIG. 1.

FIG. 4 is a fragmentary vertical section taken on line 4—4 of FIG. 1.

DESCRIPTION OF THE PREFERRED EMBODIMENT

Referring with greater particularity to the drawings, an apparatus embodying the principles of the present invention is generally indicated by the numeral 10 in FIG. 1. The apparatus can, of course, be mounted and supported in any suitable manner. However, the apparatus has particular utility in poultry processing plants wherein it is mounted on and supported by a wall 11 of the plant and positions the apparatus to form an operable portion of the overall poultry processing equipment within the plant.

Figure 2:
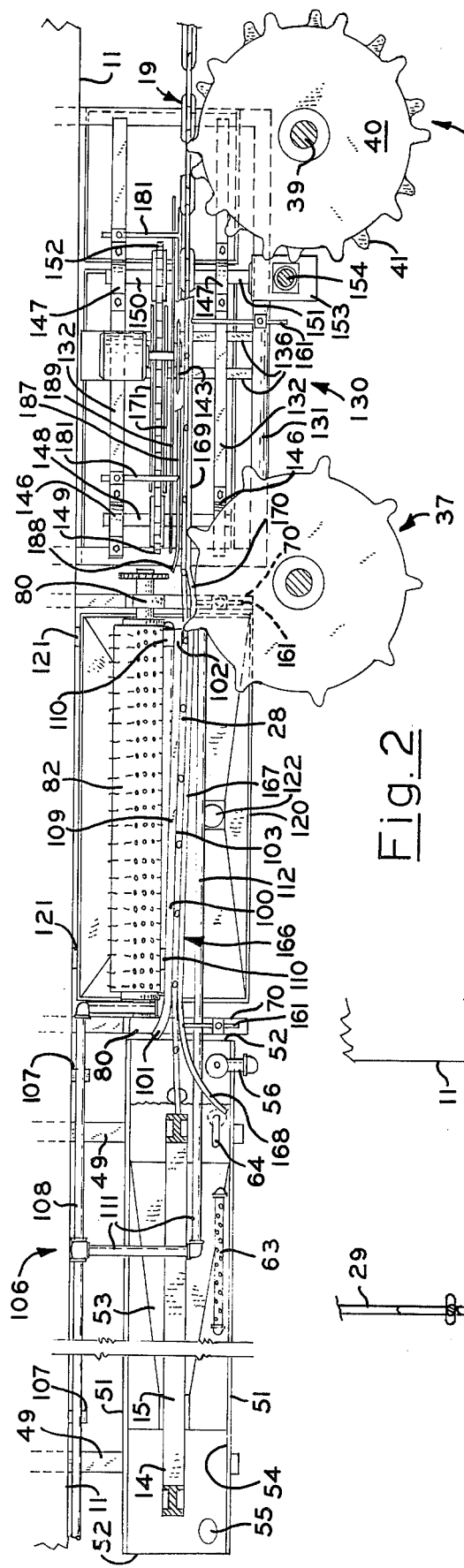
FIG. 2 is a somewhat enlarged horizontal section of the apparatus taken on line 2—2 of FIG. 1.

The apparatus 10 has a conveyor assembly 12 which is secured on the wall, as best shown in FIG. 1. The conveyor assembly preferably forms a portion of the conveyor assembly of the processing plant so that processing continues in uninterrupted sequence both before and, if necessary, after processing by the apparatus of the present invention. The conveyor assembly 12 has a plurality of supports 13 secured on the wall on which is mounted a track or guide rail 14 in spaced, substantially parallel relation to the wall. The rail is I-shaped in cross section, as best shown in FIG. 2. The rail has a lowered portion 15 which slopes downwardly, then substantially horizontally and subsequently slopes upwardly as best shown on the left in FIG. 1. The rail extends continuously from the lowered portion to the right as viewed in FIG. 1 to form a horizontal portion 16.

The conveyor assembly 12 includes a plurality of trolley assemblies 17 which are borne by the guide rail 14 for rolling engagement therealong. Each trolley assembly has a pivotal connection 18 at the lower end thereof. The conveyor assembly includes a chain 19 composed of a plurality of interconnected links 20. The trolley assemblies are spaced at intervals along the guide rail and extend through and are secured, as by welding, on every fourth link of the chain, as best shown in FIG. 1. The chain is thus supported on the trolley assemblies beneath the guide rail. A mount 21, having a pivotal connection 22 at the lower end thereof, extends through and is affixed on every second link of the chain thus alternating with the trolley assemblies to be connected to every other link of the chain.

The apparatus 10 has a blanching station 23, through which the lowered portion 15 of the rail 14 extends, and a skinning station 24 and severing station 25, through which the horizontal portion 16 of the rail extends. The conveyor assembly is powered by any suitable mechanism, not shown, to transport the chain 19 in the direction indicated by arrow 26 from left to right as viewed in FIG. 1.

Figure 6:
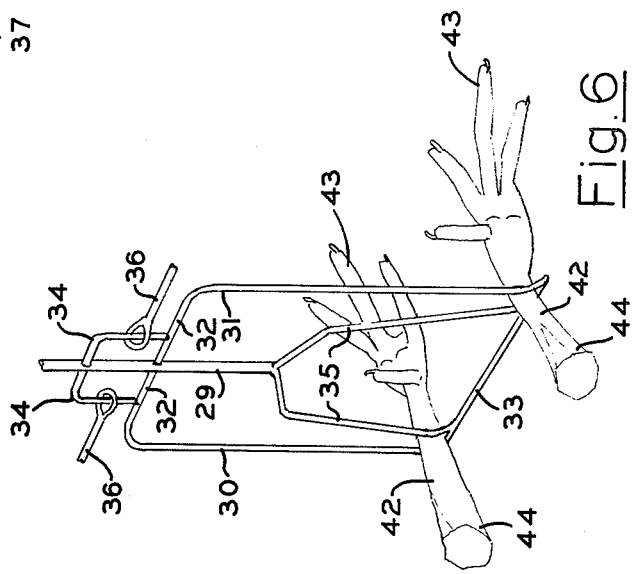
FIG. 6 is a somewhat further enlarged fragmentary perspective view of a representative shackle utilized in the apparatus of FIG. 1.
Figure 5:
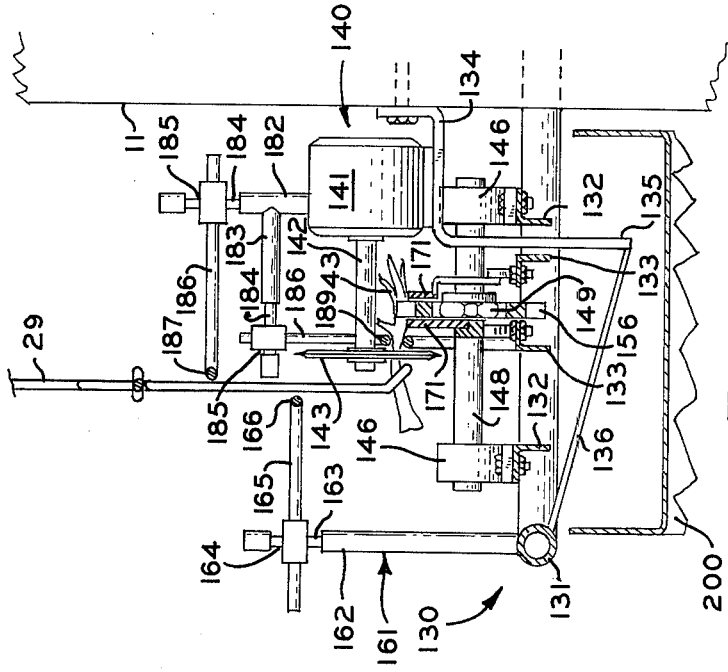
FIG. 5 is a somewhat enlarged fragmentary vertical section taken on line 5—5 of FIG. 1.

The conveyor assembly 12 mounts a multiplicity of shackles 28. The shackles individually have rods 29 which are individually, pivotally mounted on the pivotal connections 18 and 22 of the trolley assemblies 17 and mounts 21 respectively. Each shackle has a substantially rectangular frame 30 affixed thereon in spaced relation to its respective pivotal connection 18 or 22. The frame forms a substantially flat plane. The frame of each shackle is composed of a pair of side rods 31 of substantially equal length disposed on opposite sides of the rod 29 substantially parallel thereto and being individually connected at their upper ends to the rod 29 by a pair of upper rods 32. A lower rod 33 interconnects the lower ends of the side rods. The frame has a pair of rods 34 individually interconnecting the upper rods 32 and the rod 29 on opposite sides of the rod 29. A pair of interior rods 35 individually interconnect the rod 29 within the frame and the lower rod 33 so as individually to approach the side rods 31, as best shown in FIGS. 1 and 6. The end portions of the side rods, interior rods and the lower rod 33 deviate from the substantially flat plane of the frame 30 to extend diagonally downwardly and toward the wall 11, as best shown in FIGS. 5 and 6. Each shackle 28 is connected to the shackles immediately adjacent thereto by connecting links 36 which interconnect adjacent rods 34 of the frames, as best shown in FIGS. 1 and 6.

The apparatus 10 has a pair of shackle alignment assemblies 37. The assemblies are mounted on the wall 11 and guide rail 14 in predetermined spaced relation in the severing station 25 of the apparatus, as best shown in FIG. 1. Each of the assemblies has bearing assemblies 38 which are affixed on the guide rail to define a vertical axis of rotation. A shaft 39 is rotationally mounted in the bearing assemblies of each alignment assembly for rotation about the axis of rotation. A power take-off sprocket 40 is secured on each shaft and engages the links of the chain 19 in driven relation. A pair of control sprockets 41 are borne by the shaft of each alignment assembly 37 for engagement with the frames 30 of the shackles. It will be seen that movement of the conveyor assembly 12, and in particular the chain 19, to the right as viewed in FIG. 1 causes the sprockets 40 of the alignment assemblies to be rotated and, in turn, cause rotation of the control sprockets 41. Such controlled movement of the sprockets and the operation of the connecting links 36 causes the shackles to be retained, under tension where deviation tends to occur, in virtually precise vertical alignment during passage through the severing station 25. It will also be seen that the conveyor assembly 12 could be driven by powering either or both of the shafts 39 of the shackle alignment assemblies. As previously noted however, it is preferred that the conveyor assembly be powered by the mechanism, not shown, which drives the conveyor assembly throughout the plant in which the apparatus is employed. Except where controlled, as by the alignment assemblies 37, the shackles are suspended as described for limited movement toward and from the wall 11 as well as in movement permitted by the pivotal connections 18 and 22.

The shackles 28 are individually adapted to receive the lower leg portions 42 of poultry or the like, as best shown in FIG. 6. Where the apparatus 10 is employed in a poultry processing plant, the poultry are initially suspended in the shackles in whole condition for automatic processing during movement through the plant. When these shackles reach the apparatus of the present invention, all that remains of the poultry are the leg portions, as shown in FIG. 6. The leg portions are, at this point, complete with skin and have not been previously processed. Each lower portion includes the foot 43 and the knee portion 44. The leg portions are individually fitted between a side rod 31 and the adjacent interior rod 35 with the foot disposed toward the wall 11.

A pair of supports 49 are mounted on and extend outwardly from the wall 11 in the blanching station. An upwardly open blanching tank 50, best shown in FIGS. 1 and 2, is mounted on the supports 49 in the blanching station 23 of the apparatus 10 below the lowered portion 15 of the rail 14. The tank has substantially vertical, parallel side walls 51 joined at their ends by end walls 52 which slope downwardly away from the rail. The walls are interconnected in sealed relation at their lower ends by a floor 53. The tank has an elongated rectangular opening 54 disposed so as to face toward the rail and aligned substantially longitudinally therewith.

An overflow conduit 55 is mounted on the end wall 52 of the tank 50 at a predetermined elevation above the floor 53. The conduit communicates with the interior of the tank and leads to a suitable means for fluid discharge. A source 56 of a suitable fluid 57 such as water is mounted on the apparatus and is operable to discharge the fluid into the tank through the opening 54. The overflow conduit 55 operates to insure that the level of the fluid within the tank does not rise above the level indicated at 58. A drain conduit 59, having a control valve 60, is mounted in connection with the tank and is operable to drain the fluid from the tank when desired. A steam conduit 61, connected to a source of steam under pressure, does not extend in fluid sealing relation through the floor 53 of the tank. A thermostatic control valve 62 is mounted on the conduit in controlling relation to steam traveling through the conduit. The conduit has a perforated discharge nozzle or pipe 63 secured thereon within the tank and extending substantially parallel to the floor 53 of the tank well below the normal fluid level 58. A temperature sensor 64 is mounted on an end wall 52 of the tank and extends internally thereof, as best shown in FIG. 1. A lead line 65 operatively interconnects the sensor and the control valve so that a fluid temperature within a predetermined range can be maintained by the admission of heated steam to the tank, as necessary, through the pipe upon operation of the valve as controlled by the sensor. The temperature of the fluid is preferably retained in the range of from 180° Fahrenheit [82.2° Centigrade] to 190° Fahrenheit [87.7° Centigrade], although the temperature can be varied from this range by adjusting the length of time of the immersion, accordingly, as will hereinafter be described.

It is to be understood that any other suitable arrangements for maintaining the level and temperature of the liquid bath can be utilized. It will also be understood that the dimensions and proportions of the tank 50, the position of the connection of the overflow conduit 55 with the tank, the length of the rods 29 of the shackles 28 and the extension downwardly of the lowered portion 15 of the rail 14 are such that, as the shackles are transported by the conveyor assembly along the lowered portion of the rail, the frames 30 of the shackles are immersed in the fluid to the extent shown in FIG. 1.

Figure 7:
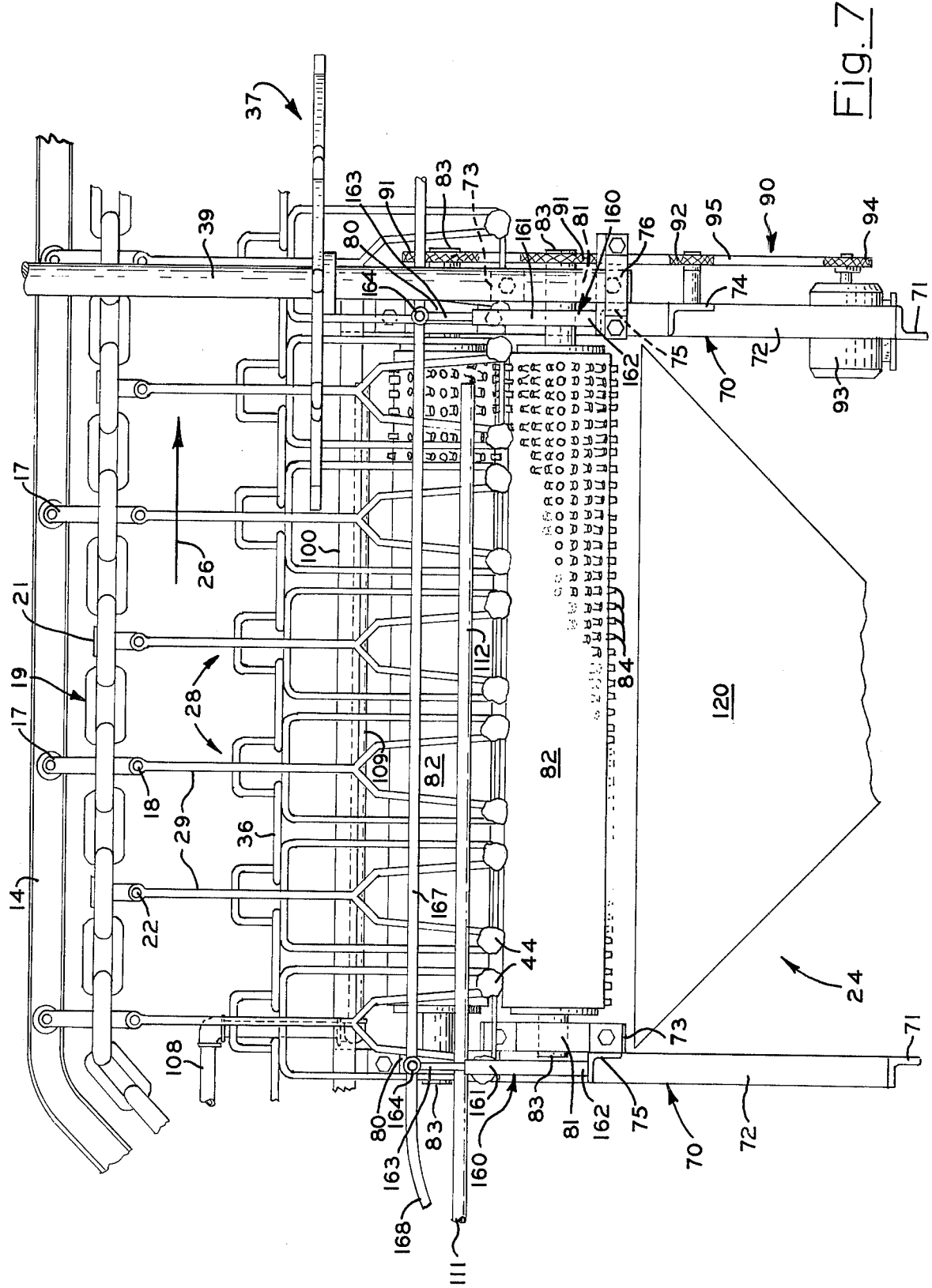
FIGS. 7 and 8 are exploded views of the skinning station and the severing station respectively.

A pair of support frames 70 are affixed on the wall 11 on opposite sides of the skinning station 24 of the apparatus 10, as best shown in FIGS. 1, 4 and 7. Each of the support frames has a pair of main members 71 individually mounted on the wall 11 and extending outwardly therefrom in spaced, substantially parallel and vertically aligned relation. A vertical member 72 is secured on the main members of each support frame in interconnecting relation normal to the main members and spaced from the wall 11. A flange 73 is secured on the vertical member of each support frame extending to the right thereof as viewed in FIG. 7. A second flange 74 is affixed on the vertical member on the right as viewed in FIG. 7 below its respective flange 73 and extending outwardly therefrom normal to the wall. A horizontal member 75 is mounted on the vertical member 72 of each support frame at substantially the same position as the second flange 74 and extends outwardly from the vertical member normal thereto in a direction away from the wall 11. A bearing assembly 76 is mounted on the remote end of the horizontal member 75 with the shaft 39 of the shackle alignment assembly 37 on the left as viewed in FIG. 1 journaled for rotational movement therein.

An upper pair of bearings 80 are mounted on the vertical members 72 of the support frames 70 in the skinning station 24 of the apparatus, as best shown in FIGS. 1, 2, 4 and 7. A lower pair of bearings are mounted on the flanges 73 of the support frames. Each pair of bearings defines an axis of rotation extending substantially parallel to the horizontal portion 16 of the rail 14 and more closely adjacent to the wall 11 than the rail. The pairs of bearings are disposed in spaced predetermined relation to each other and to the rail as shown in FIGS. 1, 3 and 4.

A pair of substantially cylindrical skinning rollers 82, having oppositely extending mounting shafts 83, are individually mounted in the skinning station 24 of the apparatus 10 with the shafts 83 of each roller journaled in one of the pairs of bearings 80 and 81. The rollers throughout their length bear a plurality of radially projecting, resilient fingers 84, as best shown in FIGS. 3 and 4. The fingers extend from the rollers to tips 85 at their terminal ends. The tips individual to the rollers are juxtapositioned between the rollers and define a bite 86 therebetween. The rollers 82 are driven rotationally in opposite directions by a drive mechanism 90, best shown in FIGS. 1 and 4. The drive mechanism is mounted on the support frame 70 on the right, as viewed in FIG. 1, at the ends of the rollers. Each roller has a driven sprocket 91 affixed on its respective shaft 83 for rotational movement therewith. The sprockets are vertically aligned. The drive mechanism has an idler sprocket assembly 92 mounted on the flange 74 of the support frame 70 on the right as viewed in FIG. 7 below the sprockets 91 and a greater distance from the wall than said sprockets. The idler sprocket is mounted for rotational movement about an axis substantially parallel to the axes of the rollers. The mechanism has an electric motor 93, connected to a suitable source of electrical energy, not shown, which rotationally powers a drive sprocket 94 borne thereby and having an axis substantially parallel to the axes of the rollers. The sprockets 91, 92 and 94 are disposed in a substantially common vertical plane and are linked by a drive chain 95, as best shown in FIG. 4 so as to rotationally drive the srocket 91 of the upper pair of bearings 80 in a counterclockwise direction and the sprocket 91 of the lower pair of bearings 81 in a clockwise direction, as viewed in FIG. 4.

The dimensions of the rollers 82, the material of their fingers 84 and their rotational speed of the rollers is such that the skin of the feet 43 is loosened without excessive friction which would cause flesh to be removed along with the skin or will even destroy the feet. Rollers of a type having rubber fingers 84 and developed for the commercial peeling of vegetables have been found suitable for the purpose. A suitable roller is 4½ inches [11.43 cm] in diameter, bears fingers extending radially ½ inch [1.27 cm] and has an axial length of 10 feet [3.048 m]. Such a roller has been discovered to provide optimum skinning results when driven at a rotational speed of 480 revolutions per minute and when utilized with a conveyor assembly transporting the shackles at a rate of speed of 60 feet [18.288 m] per minute through the apparatus herein described.

A withdrawal bar 100, shown in FIGS. 1 and 2, is mounted on the upper main members 71 of the support frames 70 and extends substantially horizontally above the skinning rollers 82 and parallel to their axes so as to be engaged by the shackles 28 on the sides thereof disposed toward the wall 11 during operation of the apparatus. The withdrawal bar extends, as best shown in FIG. 2, from a position substantially above the upper bearing 80 adjacent to the blanching tank 50 to a position substantially above the opposite upper bearing but spaced a greater distance from the wall, as best shown in FIGS. 1 and 4. As shown in FIG. 2, the bar has an entry portion 101 nearest the tank 50 which is curved toward the wall to receive the shackles as they approach the skinning rollers 82 so that the feet 43 borne by the shackles are guided into the bite 86 of the rollers. The balance of the bar is substantially linear, but diverges from the axes of rollers and the wall 11 in the direction of movement of the shackles to an exit portion 102. The withdrawal bar has, as shown in FIGS. 3 and 4, a planar surface 103 adapted to be engaged by the shackles. The planar surface is preferably coated with a layer of friction reducing material, such as plastic. The withdrawal bar is positioned to guide the shackles 28 as they approach the rollers 82 so that the feet 43 borne by the shackles enter the bite 86 between the rollers as shown in FIG. 3. As the shackles are conveyed along the rollers, the withdrawal bar forces the shackles to be gradually pivoted and thereby diverted laterally of the rollers, as shown in FIG. 4, to withdraw the feet from the bite thereby removing the skin from the feet as will hereinafter be more fully described.

For satisfactory removal of the skin from the feet, it is essential that the feet 43 be withdrawn laterally from the bite 86 while the feet are being conveyed axially along the rollers 82. With rollers dimensioned and rotating as previously described, satisfactory skinning will occur if the feet are withdrawn laterally 2 inches [5.08 cm] in a distance of 10 feet [3.048 m].

The apparatus 10 has a spray system 106 which extends through the skinning station 24. The system includes a plurality of suitable brackets 107 which are mounted on the wall 11 and support a first conduit 108 thereon, as best shown in FIGS. 1 and 3. The first conduit is connected to a suitable source of water under pressure, not shown. The first conduit has a spray portion 109 extending along the withdrawal bar 100 and provided with water under pressure from the first conduit 108. The spray portion of the first conduit is mounted on the withdrawal bar by brackets 110 on a side thereof facing the upper skinning roller 82. The spray portion has a plurality of orifices, not shown, facing in the direction of the upper roller through which water is discharged in spray form on the upper roller, as best shown in FIGS. 3 and 4. A second conduit 111 is connected to the first conduit in receiving relation to water under pressure from the source. The second conduit has a spray portion 112 extending substantially parallel to the upper roller and on the opposite side of the shackles 28 from the roller. The second conduit also has a plurality of orifices, not shown, through which water is directed as a spray toward the rollers.

A waste hopper 120 is secured on the wall 11 by suitable mounts 121 disposed below the rollers 82, as best shown in FIGS. 1 and 2. The waste hopper has a drain conduit 122 at the lower end thereof which communicates with a suitable waste disposal system, not shown. As will hereinafter be described in greater detail, the waste hopper receives the skin which is removed from the lower leg portions 42 by operation of the rollers. The hopper also receives the water discharged from the spray system 106 which, in combination with gravity, serves to wash this waste material down the drain conduit for disposal.

Figure 8:
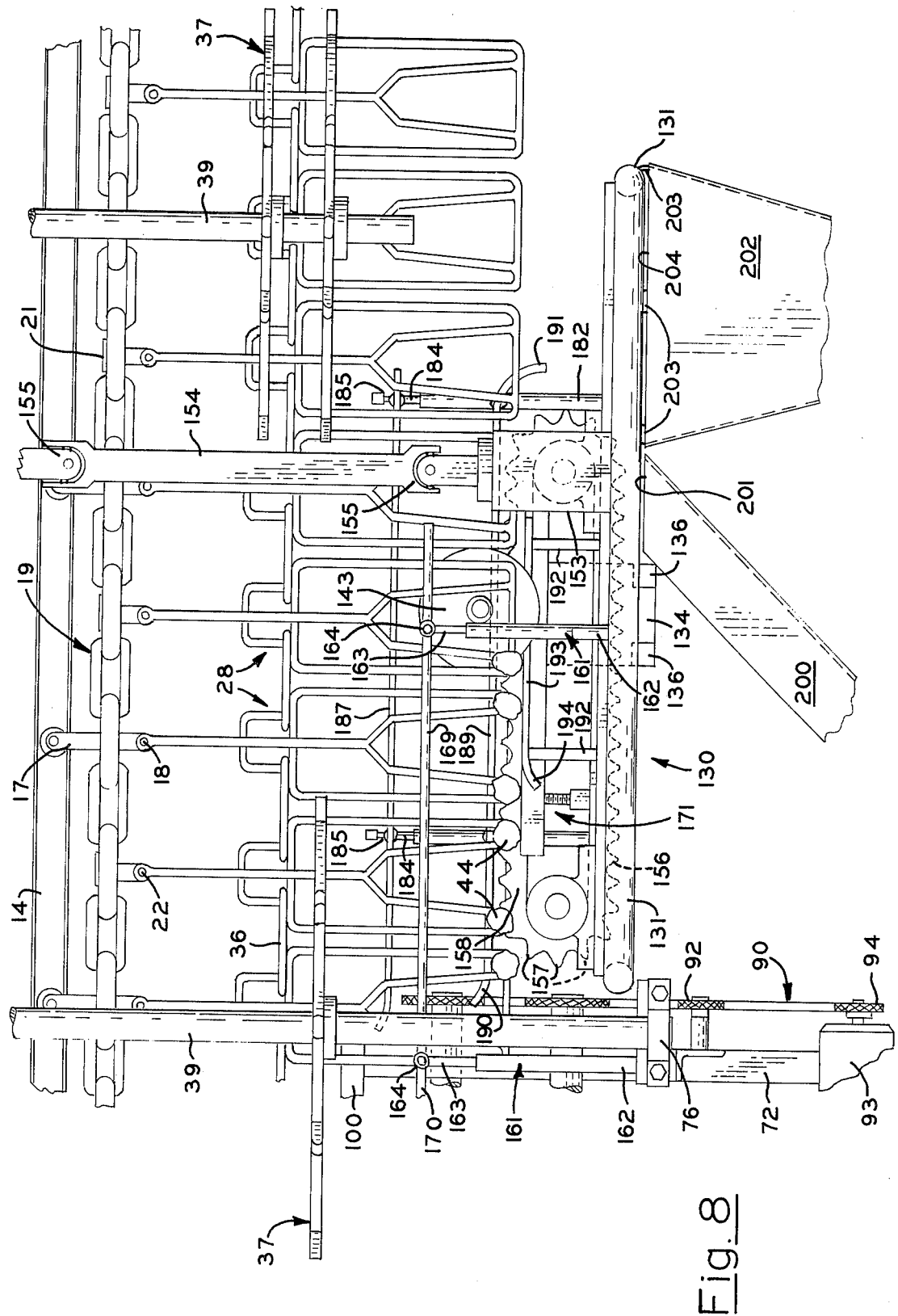

A support frame 130 is mounted on the wall 11 in the severing station of the apparatus 10, as best shown in FIGS. 1, 2 and 8. The support frame 130 has a tubular peripheral member 131 secured on the wall 11 and extending substantially horizontally outwardly therefrom. A pair of outer angle iron cross members 132 are affixed on the peripheral member 131 extending in spaced, substantially parallel relation to each other and to the wall, as best shown in FIG. 5. A pair of inner angle iron cross members 133 are fastened on the peripheral member in spaced relation between the outer cross members extending substantially parallel thereto. A motor mount 134 is secured on the wall 11 at a predetermined position above the frame and has a portion 135 extending downwardly through the frame, as best shown in FIG. 5. A pair of braces 136 interconnect the portion 135 and the outermost portion of the peripheral member 131.

A circular saw 140, shown in FIGS. 1, 2 and 5, is mounted on the motor conduit 134. The saw, as best shown in FIG. 5, includes a drive motor 141, connected to a suitable source of electrical energy, not shown. The drive motor mounts a drive shaft 142 for rotational movement extending substantially horizontally and at right angles to the path of movement of the shackles 28. A saw blade 143 is affixed on the distal end of the drive shaft 142 extending into the path of travel of the leg portions 42 as they are transported through the severing station 25. The saw blade thus intersects each leg portion 42 between the foot 43 and the knee portion 44, as shown in FIG. 5. An 8½ inch [21.59 cm] diameter, knife-edged saw blade driven at substantially 3600 revolutions per minute has been found well suited to this purpose.

A first pair of bearing blocks 146 are mounted on the outer cross members 132 of the support frame 130 to the left of the circular saw 140, as viewed in FIG. 2, defining an axis of rotation substantially normal to the path of travel of the shackles 28 through the severing station 25. The axis defined by the first bearing blocks are disposed somewhat below the path of the shackles, as shown in FIG. 5.

A second pair of bearing blocks 147 are affixed on the outer cross members to the right of the circular saw 140 as viewed in FIG. 2. The bearing blocks 147 define an axis substantially parallel to the axis defined by the bearing blocks 146. A shaft 148 is received for rotational movement in the first pair of bearing blocks 146 and mounts a sprocket 149 thereon to the right of the path of travel of the shackles, as viewed in FIG. 5. A shaft 150 is mounted for rotational movement in the second pair of bearing blocks 147 and has an end portion 151 extending outwardly from and beyond the bearing blocks 147 away from the wall 11. The shaft 150 mounts a sprocket 152 for rotation therewith and in alignment with the sprocket 149. A right angle gear box 153 is secured on the peripheral member 131 in driving connection to the end portion 151 of the shaft 150. A drive assembly 154, having a pair of universal joints 155 is connected in driving relation to the right angle gear box and extends substantially vertically therefrom.

An endless chain 156 is extended about and is engaged by sprockets 149 and 152 as best shown in FIG. 8. The chain bears throughout its length a plurality of teeth 157 extending outwardly from the chain. The chain has an upper reach or run 158 which is positioned so that the teeth engage the feet 43 as the shackles are transported through the severing station.

As can best be visualized in FIG. 8, the shafts 39 of the shackle alignment assemblies 37 and the drive assembly 154 can be driven by any suitable means, not shown. The shafts 39 are driven at the same rotary speed and it is preferred that the drive assembly be driven at the same speed. This can be accomplished by driving both shafts and the assembly from the same drive source. Alternatively, the gear box 153 can be so constructed that the specific rotary speed of the drive assembly 154 is converted to the rotary speed of the shafts 39 in driving shaft 150. In any event, the speed of movement of the shackles 28 through the severing station is the same as that of the upper run 158 of the chain 156 and the spaces between the teeth 157 are synchronized with the spaces between the side rods 31 and respective adjacent interior rods 35 of the shackles, as best shown in FIG. 8.

A shackle guide assembly 160 is mounted on the apparatus 10 extending through the skinning and blanching stations 24 and 23 respectively along the path of travel of the shackles 28 and on the side thereof opposite to the wall 11. The guide assembly includes three guide supports 161, as best shown in FIGS. 1, 2, 7 and 8. Two of the guide supports are individually affixed in upright relation on the horizontal members 75 of the support frames 70. One of the guide supports is secured in upright relation on the peripheral member 131 of the support frame 130. Each of the guide supports includes a base portion 162 in which a rod 163 is received for vertical movement and adapted to be locked in a selected vertical position. A clamp mechanism 164 is affixed at the upper end of each rod 163 in which a rod 165 received for slidable movement along a substantially horizontal path. The clamp mechanisms are adapted to lock their respective rods 165 in selected positions along the horizontal paths. A guide bar 166 is secured, as by welding on the rods 165 at the ends thereof nearest the rollers 82. The guide supports are adjusted to position the guide bar 166 at an elevation approximately equal to the elevation of the roller 82 in the upper bearings 80, as best shown in FIG. 4. The guide bar 166 has a central portion 167 which is parallel to and laterally spaced somewhat from said path of travel through the skinning station 24 of the apparatus. The guide bar has a curved portion 168 which extends from the central portion 167 substantially beyond the rollers 82 to the left as viewed in FIGS. 1 and 7 to terminate above the blanching tank 50. This end is spaced from the wall 11 a substantially greater distance than is the central portion 167. The curved and central portions 167 and 168 of the guide bar serve to guide the shackles 28 and the feet 43 engaged thereby into and through the bite 86 of the rollers 82. The guide bar has a right hand portion 169 extending from the central portion substantially through the severing station 25 of the apparatus. A junction portion 170 of the guide bar interconnects the central and right hand portions to provide a relatively smooth transition therebetween. The guide bar acts to guide movement of the shackles through the skinning and severing stations 24 and 25 respectively of the apparatus and prevent pivotal movement of the shackles from the desired path to the left as viewed in FIGS. 1, 3, 4 and 5.

A pair of elongated, planar upper run guide assemblies 171 are mounted on the inner cross members 133 of the support frame 130 juxtapositioned on opposite sides of the upper run 158 of the chain 156 extending substantially parallel to the path of travel of the shackles to limit lateral movement of the upper run.

A pair of guide supports 181 are mounted in upstanding relation on the outer cross member 132 nearest the wall 11, as can best be seen in FIG. 2, in spaced relation on opposite sides of the circular saw 140. Each guide support has a base portion 182, secured on the outer cross member in upstanding relation, having an arm 183 extended outwardly substantially horizontally therefrom toward the path of the shackles 28 through the severing station 25, as best shown in FIG. 5. A rod 184 is received for selected positioning in both the base portion and arm of each guide support and has a clamp mechanism 185 on the remote end thereof. The clamp mechanism of the base portion is oriented on its rod to define a substantially horizontal axis. The clamp mechanism of the arm 183 is oriented on its rod to define a substantially vertical axis. A rod 186 is slidably received in each of the clamp mechanisms of each guide support. The clamp mechanisms are adapted to lock their respective rods 186 in selected positions.

A shackle guide bar 187 is borne by the remote ends of the rods 186 which extend in horizontal relation from the base portions 182 of the guide supports 181. The shackle guide bar 187 extends horizontally through the severing station 25 substantially parallel to and above the guide bar 166, but offset slightly therefrom in the direction of the wall 11, as best shown in FIG. 5. The guide bar 187 extends from a curved entrance end portion 188 approximately above the upper driven sprocket 91 of the drive mechanism 90 through the severing station 25 to a point somewhat beyond the endless chain 156 to the right as viewed in FIG. 8. The guide bar 187 is adapted to guide the shackles into engagement with the guide bar 166 to retain the shackles in the desired positions during passage through the severing station 25.

An upper foot guide 189 is affixed on the remote, downwardly extending ends of the vertical rods 186 of the arms 183 of the guide supports 181, as best shown in FIG. 5. The guide 189 extends from an upwardly curved entrance end portion 190 through the severing station 25 between the saw blade 143 and the chain 156 to a downwardly curved exit portion 191 extending in spaced relation about the portion of the chain 156 on the right as viewed in FIG. 8.

A pair of supports 192 are secured in upstanding relation on the inner cross member 133 on the left as viewed in FIG. 5. A lower foot guide 193 is mounted on the supports extending from an entrance portion 194 through the severing station 25 between the saw blade 143 and the chain 156 substantially parallel to the corresponding portion of the upper foot guide 189. The foot guides 189 and 193 are preferably spaced vertical a slightly greater distance than the thickness of the portions of the chicken feet 43 to be passed therebetween.

An upwardly open waste chute 200, having an upper end 201, is secured on the wall 11 with the upper end thereof positioned below the sprocket 152. The chute extends diagonally downwardly along the wall below the saw blade 143. A foot receiving hopper 202 is mounted on the support frame 130 by brackets 203. The hopper has an upwardly disposed rectangular opening 204 disposed below the exit portion 191 of the upper foot guide 189. The hopper is disposed gravitationally to receive feet 43 subsequent to severing in the severing station 25.

OPERATION

The operation of the described embodiment of the present invention is believed to be clearly apparent and is briefly summarized at this point. When the apparatus 10 is in operation, the conveyor assembly 12 continuously transports the shackles 28 through the apparatus along a path of travel which sequentially passes through the blanching station 23, the skinning station 24, and the severing station 25. As previously described, the shackles, prior to entering the blanching station, each have a pair of poultry leg portions 42 engaged therein, as best shown in FIG. 6. Each leg portion is engaged by the frame 30 at the shackle between one of the side rods 31 and the adjacent interior rod 35 with the foot 43 extending from the frame 30 toward the wall 11.

Since the conveyor assembly 12 preferably constitutes an integral portion of the equipment within a poultry processing plant and since the poultry feet are initially so engaged when the poultry are placed in the line for processing, no additional operations are required to transfer the leg portions to the apparatus 10 embodying the present invention for processing therein.

The thermostatic control valve 62 permits steam to flow into the fluid 57 within the blanching tank 50 through the perforated pipe 63 as required to maintain the fluid substantially at a predetermined blanching temperature as indicated by the sensor 64. Any excess liquid flows from the fluid through the overflow connection 55 so that the fluid level 58 is maintained at a predetermined level as well as at a predetermined temperature. As the shackles 28 bearing lower leg portions 42 are transported along the lowered portion 15 of the rail 14, the shackles move downwardly and then upwardly as shown in FIG. 1, so that the leg portions are completely immersed in and then removed from the heated fluid. The temperature of the fluid and the period of immersion are such that the skin of each foot 43 is blanched without appreciably cooking the flesh. It is essential that the skin reach a temperature of at least 150° Fahrenheit [65.5° Centigrade] without exceeding a temperature of 160° Fahrenheit [71.1° Centigrade] for more than 4 seconds. In any event, the skin should not exceed a temperature of 165° Fahrenheit [73.8° Centigrade]. Immersion of the leg portions in a tank of the fluid maintained at 190° Fahrenheit [87.7° Centigrade] for a period of ten seconds will satisfy these criteria.

As the shackles 28 leave the blanching station 23 of the apparatus 10, they enter the skinning station 24 bearing the leg portion 42 which have been blanched. As previously described and best shown in FIGS. 3, 4 and 7, when the apparatus is in operation, the motor 93 is energized so that the drive mechanism 90 rotationally drives the skinning rollers 82 in opposite direction as previously described. Water under pressure is supplied to the spray system 106 and discharged from the spray portions 109 and 112 onto the upper skinning roller in the form of spray. As the shackles enter the skinning station, they are guided into engagement with the planar surface 103 of the withdrawal bar 100 by the entry portion 101 thereof or by the curved portion 168 of the guide bar 166. As a result, the feet 43 are guided into the bite 86 between the skinning rollers and subjected to a rotary stroking action of the fingers 84, as best shown in FIG. 3.

As the shackles 28 continue through the skinning station 24, the frames 30 move in sliding engagement along the planar surface 103 of the withdrawal bar 100. The shackles are guided by the withdrawal bar gradually away from the rollers 82 so that the shackles swing laterally of the trolley assemblies 17. As the feet are withdrawn, the skin of each foot, which has been loosened by blanching in the tank 50 and by the stroking action of the fingers 84, is removed in a manner analogous to the removal of a glove from the hand. As previously discussed, it is necesary that the feet be withdrawn laterally from the bite simultaneously with being transported axially between the rollers if the skin is to be removed from the feet without also removing flesh from the feet.

After the skin is removed from the feet 43, the skin is urged by gravity and by the action of the spray from the spray system 106 downwardly into the waste hopper 120 for subsequent disposal.

As the shackles 28 leave the skinning station 24 of the apparatus 10, they enter the severing station 25. As the shackles enter the severing station they are, as shown in FIG. 2, received between the junction portion 170 of the guide bar 166 and the entrance end portion 188 of the shackle guide bar 187. Each shackle is confined within this space between the guide bars 166 and 187 as best shown in FIG. 5, and directed therethrough toward the saw blade 143. The optimum position for the shackles relative to the saw blade and thus the leg portions relative thereto can be achieved by adjustment of the guide supports 161 and 181 respectively through operation of the clamp mechanisms 164 and 185 to adjust the rods 165 and 186 therewithin. Proper positioning of the leg portions is also ensured by the guide assemblies 171 which limit lateral movement of the upper run 158 of the endless chain 156.

As the leg portions 42 enter the severing station 25, they are guided into individual engagement between the teeth 157 of the chain 156 by the curved entrance portion 190 of the upper foot guide 189. The shackle alignment assemblies 37, in sequence with the chain 156 through the drive assembly 154 and right angle gear box 153, operate as previously described to index the leg portions for receipt between the teeth 157 of the chain. Each leg portion is carried along the upper run 158 of the chain. The entrance portion 194 of the lower foot guide 193 directs the leg portions between the upper and lower foot guides 189 and 193 respectively so that the leg portions and feet are properly aligned vertically, as shown in FIG. 5, when they approach the saw blade 143.

The drive motor 141 is energized to rotate the saw blade 143 during use of the apparatus 10. Thus, continued movement of the chain 156 together with the leg portions 42 severs the feet 43 therefrom. After such severing the feet are transported by the chain and gravitationally deposited in the foot receiving hopper 202 for subsequent collection, final processing and packing. The balance of each leg portions remains in engagement with its respective shackle 28 and is transported by the conveyor assembly 12 to a location where it is removed from the shackle. Any of the fragments of the leg portions which become dislodged in the severing station fall into the waste chute 200 for subsequent disposal.

Therefore, the method and apparatus of the present invention operate automatically, dependably and economically to process poultry parts and are particularly well suited to the processing of poultry feet making them available in quantity at a commercially acceptable price, the method and apparatus being adapted for inclusion with the poultry processing equipment in commercial plants and compatible therewith.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by Letters Patent is:

1. An apparatus for processing poultry feet and other parts having an outer skin comprising:
   (A) means for conveying the parts along a predetermined path,
   (B) means for subjecting the parts in said path to a temperature for a time sufficient to blanch the skin and render it readily removable from the parts but insufficient appreciably to cook the flesh thereof,
   (C) a pair of friction rollers disposed axially substantially parallel to the path in the following relation to the blanching means having a part receiving bite laterally adjacent to the path,
   (D) means for rotating the rollers with their peripheries in the bite traveling away from the path, and
   (E) means for guiding the blanched parts into the bite as they are conveyed along the path whereby the rollers remove the skin from the parts.

2. An apparatus for processing poultry feet and the like comprising:
   (A) means for transporting the feet along a predetermined path of travel while pendantly supported,
   (B) means for immersing the feet in a liquid bath while transported along said path for a time and temperature sufficient to blanch the skin without appreciably cooking the flesh,
   (C) a pair of spaced substantially parallel rollers mounted for rotation about axes adjacent to the path and extended longitudinally along the path and said rollers having a bite defined therebetween disposed toward the path to receive the feet transported along the path,
   (D) means for guiding the feet into the bite,
   (E) means for rotating the rollers in opposite directions to draw the feet into the bite between the rollers and to loosen the skin therefrom, and (F) means for laterally moving the feet in relation to the bite to strip the skin from the feet.

3. The processing apparatus for poultry feet and the like of claim 2 in which the feet are attached to their respective legs, and the apparatus includes:
 (A) means for severing the feet from the legs while transported along the path from said rollers, and
 (B) means for guiding the legs into engagement with the severing means.

4. The processing apparatus for poultry feet of claim 2 wherein said rollers are provided with a plurality of substantially radially extending, flexible, resilient fingers which engage the feet while received in said bite.

5. The processing apparatus for poultry feet of claim 3 wherein said means for guiding the leg into engagement with the severing means includes a chain bearing teeth which engage feet mounted for movement substantially parallel and adjacent to said path at a velocity substantially equal to the velocity of the feet.

6. A method of skinning a poultry foot having a leg attached comprising sequentially:
 (A) supporting the foot by the leg;
 (B) immersing the foot in a liquid bath at a temperature and for a time sufficient to blanch the skin and loosen it from the flesh without appreciably cooking the flesh;
 (C) drawing the skin from the flesh in a direction away from the leg; and
 (D) severing the foot from the leg.

7. The method of claim 6 in which the skin is drawn from the flesh by repeated stroking action in a direction away from the leg.

8. The method of claim 6 in which said liquid bath raises the temperature of the surface of the foot to a temperature of at least 65° C. without exceeding a temperature of 71° C. for over four seconds.

9. The method of claim 6 in which the feet are immersed in the bath for not to exceed ten seconds at a bath temperature of approximately 87.7° C.

10. An apparatus for processing poultry feet and the like for use with a line for processing poultry wherein shackles suspended from a conveyor individually engage the legs of each bird for transport along a predetermined processing path, said apparatus comprising:
 (A) an upwardly open tank having a liquid bath therein;
 (B) means for maintaining said bath at a predetermined level and at a predetermined blanching temperature;
 (C) means for guiding the shackles along said path so that the feet are immersed in said bath for a time sufficient to blanch the skin and loosen it from the feet without appreciably cooking the feet;
 (D) a pair of substantially parallel, axially elongated, and substantially cylindrical rollers mounted for rotation about radially spaced axes extending adjacent to and laterally of the path of travel of said feet;
 (E) a plurality of resiliently flexible fingers extending substantially radially from each of said rollers;
 (F) means for rotating each of said rollers so that the tips of the fingers travel away from the shackles between said rollers;
 (G) means for guiding the shackles along said path in following relation to the tank so that the feet extend laterally of the path of travel and pass between said rollers and are oppositely frictionally engaged therebetween by fingers of each roller, to further loosen the skin from the feet;
 (H) means for guiding the shackles laterally away from the rollers as the feet pass therebetween so that the feet are withdrawn from between the rollers to strip the skin from the feet; and
 (I) means mounted in following relation to said rollers for severing the feet laterally extended from said shackles adjacent to said path from their respective legs.

11. The apparatus for processing poultry feet of claim 10 wherein the shackles engage each leg adjacent to its respective knee between the knee and the foot, and said means for severing the feet includes:
 (A) a saw having a powered cutting movement intersecting each leg between the shackle and the foot;
 (B) a chain extending substantially parallel to said path of travel and bearing a plurality of teeth extending toward the leg oppositely of the saw from the shackles;
 (C) means for moving said chain in the same direction as the shackles at a speed substantially equal thereto; and
 (D) means for guiding the shackles along said path so that each leg is engaged by the teeth in holding relation and brought into cutting relation with the saw.

* * * * *